No. 762,728. PATENTED JUNE 14, 1904.
J. W. LANGDON.
FOUNTAIN ATTACHMENT FOR PENS.
APPLICATION FILED NOV. 17, 1903.
NO MODEL.
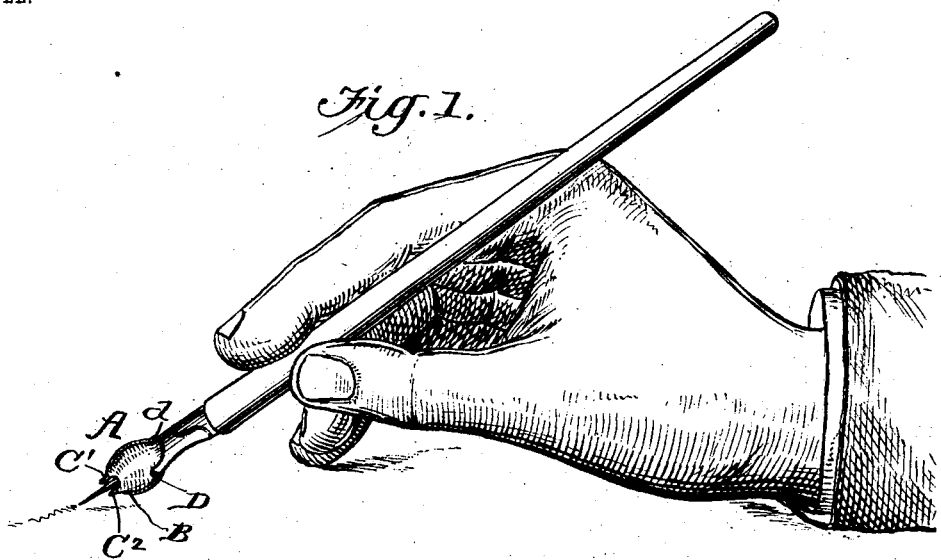
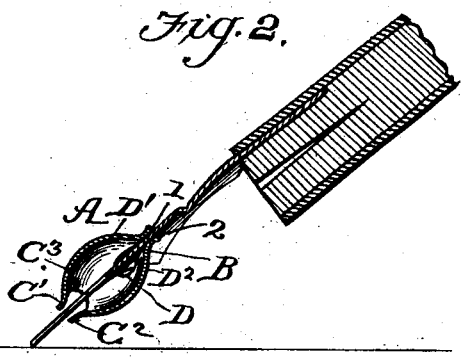
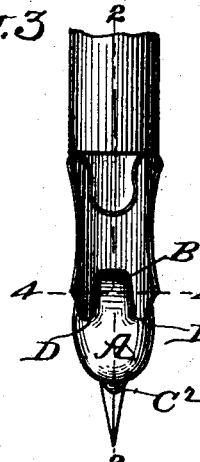
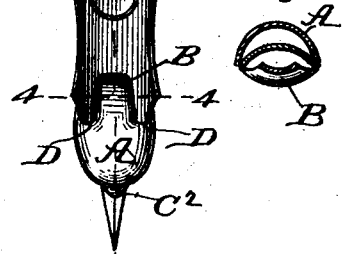
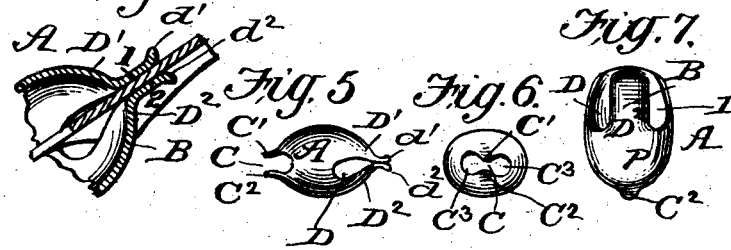
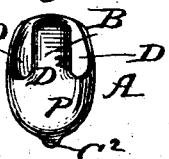
WITNESSES:
Jos. A. Ryan
Perry B. Turpin.
INVENTOR
John W. Langdon,
BY Munn & Co.
ATTORNEYS No. 762,728. Patented June 14, 1904.

UNITED STATES PATENT OFFICE.

JOHN W. LANGDON, OF WALLA WALLA, WASHINGTON.

FOUNTAIN ATTACHMENT FOR PENS.

SPECIFICATION forming part of Letters Patent No. 762,728, dated June 14, 1904.

Application filed November 17, 1903. Serial No. 181,534. (No model.)

*To all whom it may concern:*

Be it known that I, JOHN W. LANGDON, a citizen of the United States, and a resident of Walla Walla, in county of Wallawalla and State of Washington, have made certain new and useful Improvements in Fountain Attachments for Pens, of which the following is a specification.

My invention is an improved fountain attachment for pens having for an object, among others, to provide a novel construction which can be fitted and held on the pen and which can be filled and emptied through its front end and which at its said front end will be free from contact with the pen-point, so that the flexibility of the latter will in no wise be impaired; and the invention consists in certain improvements and novel constructions, as will be hereinafter described and claimed.

In the drawings, Figure 1 is a perspective view of my invention as in use. Fig. 2 is a longitudinal section of the attachment on a pen on about line 2 2 of Fig. 3. Fig. 3 is a bottom plan view of the device on a pen. Fig. 4 is a cross-section on about line 4 4 of Fig. 3. Fig. 5 is a side elevation. Fig. 6 is a front elevation. Fig. 7 is a bottom plan view, and Fig. 8 a detail perspective view, of the improved reservoir; and Fig. 9 is a detail section, partly broken away, on the same line as Fig. 2, but on an enlarged scale, to better illustrate the broad clamping-bearing of the improved device.

By my invention I seek to provide a reservoir attachment formed to provide a front feed and discharge and so constructed that when attached to a pen in position for use no part of the reservoir except that for clasping it in place on the pen-point is in contact with such pen, so that the latter has a perfectly free action, and its flexibility will not be impaired in any degree.

As shown, the improved reservoir A, which may be made of rubber, aluminium, celluloid, or other suitable material, is in the form of an oblong body somewhat flattened in cross-section, as will be understood from Figs. 4 and 6, provided at its rear end with a clasp at B to bind the pen-point and provided at its front end with the opening C, which entirely encircles the point of the pen, usually at about the base of the nibs thereof, and is free from contact with the nibs of the pen-point, a continuous space being provided entirely around the pen at the front end of the body A, as will be understood from Figs. 2, 6, and 8 of the drawings. The form of the opening C is important, it being modified by the upper and lower lips C' and $C^2$, which curve down and up toward the pen-point to such an extent as to reduce the width of the opening C at its middle in order to aid in properly confining the ink in contact with the pen-point, while the side portions $C^3$ of the opening C widen out by curving upwardly and downwardly, as best shown in Figs. 6 and 8 of the drawings. From Figs. 6 and 8 it will be noticed the body A rounds outwardly both vertically and laterally, in rear of its front opening C, thus affording sufficient holding capacity for ink, which is both fed to and discharged from the reservoir through the front opening C, as will be more fully described hereinafter. At its rear end the body A is divided longitudinally at D into upper and lower tongues D' and $D^2$, which form a clasp to bind upon the pen-point, as shown in Fig. 2, and are slightly outturned at their free extremities $d'$ and $d^2$, as shown in Figs. 2 and 5, to facilitate the application of the reservoir to a pen, as will be understood from Figs. 1, 2, and 5 of the drawings.

As before suggested, the front end of the reservoir, in fact, all portions of the reservoir in advance of the clasp, are entirely free from any contact with the pen-point in order to avoid any interference with the flexibility of the point in the use of the same in the ordinary manner. In order to prevent any parts of the reservoir in advance of its clasp from coming in contact with the pen-point, I form such clasp with a broad bearing for engagement with the pen in order to hold the reservoir steadily in the position shown in Fig. 2 of the drawings. I prefer to secure this broad bearing by the construction shown in Fig. 9, in which the tongues D' and D² are flattened, as best shown in Fig. 9 at 1 and 2, to form the broad flat bearing on opposite sides of the pen-point, as is also indicated in Figs. 2 and 5, whereby to prevent any rocking of the reservoir on the pen-point and to hold the said reservoir steadily in the poistion shown in Fig. 2, so that its front end will not at any time come in contact with the point of the pen.

In attaching the reservoir to pens the pen-point is inserted between the upper flattened tongue and the lower spring-tongue at the rear of the reservoir, and the flattened bearing between the upper and lower tongues guides the pen-point through the center of the reservoir and out between the upper and lower projecting lips of the front feed-opening without touching any part of said feed. This feed is so constructed that when the reservoir is attached to the pen no part of the feed end of the reservoir touches the pen-point, an open space being left entirely around the point, permitting perfectly natural action of the nibs and also the ready filling of the reservoir with ink through the front feed-opening by the usual operation of dipping the pen into an ink-well. This construction also permits the emptying of the reservoir when its contents have only been partially used with one or two quick downward movements of the penholder, enabling the writer to empty the reservoir just as he would discharge the surplus ink from an ordinary pen. It will be noticed that the front feed is so constructed that its upper and lower lips serve to feed the last particle of ink to the pen-point and to assist capillary attraction in retaining the ink in the reservoir and preventing the ink from accidentally dropping from the reservoir.

It will be noted that in clasping the reservoir on the pen the lower section or tongue of the clasp operates as a spring, being narrow relatively to the upper tongue and opposing the latter by a springing or resilient action and operating to securely hold the reservoir on the pen in the use of the device.

Having thus described my invention, what I claim as new, and desire to secure by Letters Patent, is—

1. The herein-described attachment for pens consisting of the body provided in its front end with an opening for the passage of the pen-point, said opening being formed with upper and lower lips spaced apart relatively in such manner as to avoid any contact with the pen-point, and divided longitudinally at its rear end—forming the upper and lower tongues having flattened portions forming broad bearings to engage with a pen-point to prevent any rocking of the reservoir, said tongues being outturned at their free ends to facilitate the insertion of a pen-point in applying the reservoir thereto.

2. An attachment for pens comprising a reservoir having a body provided at its front end with an opening so formed as to avoid any engagement of such end of the reservoir with the pen-point through which opening ink may be fed to and discharged from the reservoir and in rear of such front opening with means for holding the reservoir on a pen-point substantially as set forth.

3. The combination with a pen-point of a reservoir thereon and consisting of a body having at its front end an opening forming a passage entirely around the pen-point, and no portion of whose walls comes in contact with the pen-point, and means in rear of said front opening for securing the reservoir in place.

4. An attachment for pens comprising a reservoir provided at its front end with an opening for the ink forming a passage entirely around the pen-point and no portion of whose walls comes in contact with the pen-point and upper and lower lips projecting into said opening, the opening on opposite sides of the lips being enlarged substantially as set forth.

5. An attachment for pens comprising the reservoir having at its rear end a clasp having a broad bearing for engagement with the pen-point to prevent any rocking of the reservoir on said point and provided at its front end with an opening through which the pen-point protrudes, the said opening being so formed as to avoid any engagement of such end of the reservoir with the pen-point substantially as set forth.

6. An attachment for pens comprising an outwardly-rounded reservoir having at its front end an opening forming a continuous passage around the point of a pen no portion of whose walls comes in contact with the pen-point and at its rear end a clasp to engage with the pen-point substantially as set forth.

7. An attachment for pens comprising the reservoir having the opposing tongues at its rear end to engage with a pen-point and an opening at its front end having upper and lower lips to extend on opposite sides of and free from contact with a pen-point, substantially as set forth.

8. An attachment for pens comprising a reservoir swelled outwardly at its middle portion and provided at its rear end with a clasp to engage with a pen-point and at its front end with an opening forming a passage to encircle a pen-point through which ink may be fed to and discharged from the reservoir no portion of the walls of such passage coming in contact with a pen-point when the reservoir is applied thereto substantially as set forth.

9. A reservoir attachment for pens comprising a body provided at its front end with an opening forming a passage entirely encircling a pen-point and whose walls are free from contact with the latter at all points substantially as set forth.

10. An attachment for pens comprising a reservoir provided at its rear end with a clasp having upper and lower opposing tongues to grip a pen and flared outwardly at their free ends to facilitate the introduction of a pen-point substantially as set forth.

JOHN W. LANGDON.

Witnesses:
   SOLON C. KEMON,
   PERRY B. TURPIN.